(12) United States Patent
Huang et al.

(10) Patent No.: US 10,931,339 B2
(45) Date of Patent: Feb. 23, 2021

(54) METHOD AND DEVICE FOR DETERMINING UPLINK TRANSMISSION CODEBOOK

(71) Applicant: CHINA ACADEMY OF TELECOMMUNICATIONS TECHNOLOGY, Beijing (CN)

(72) Inventors: Qiuping Huang, Beijing (CN); Qiubin Gao, Beijing (CN); Tamrakar Rakesh, Beijing (CN); Xin Su, Beijing (CN); Runhua Chen, Beijing (CN); Hui Li, Beijing (CN); Mengjun Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/638,265

(22) PCT Filed: Jul. 10, 2018

(86) PCT No.: PCT/CN2018/095193
§ 371 (c)(1),
(2) Date: Feb. 11, 2020

(87) PCT Pub. No.: WO2019/029311
PCT Pub. Date: Feb. 14, 2019

(65) Prior Publication Data
US 2020/0204225 A1  Jun. 25, 2020

(30) Foreign Application Priority Data
Aug. 11, 2017  (CN) .......................... 201710686814.9

(51) Int. Cl.
H04B 7/0456 (2017.01)

(52) U.S. Cl.
CPC ......... *H04B 7/0456* (2013.01); *H04B 7/0469* (2013.01)

(58) Field of Classification Search
CPC .... H04B 7/0456; H04B 7/046; H04B 7/0469; H04B 7/0486; H04B 7/0417; H04B 7/0619; H04B 7/0639
See application file for complete search history.

(56) References Cited

U.S. PATENT DOCUMENTS 8,971,436 B2   3/2015  Nagata
10,477,530 B2 * 11/2019  Xu ........................ H04L 5/0016
(Continued)

FOREIGN PATENT DOCUMENTS

CN  101534527 A  9/2009
CN  101686110 A  3/2010
(Continued)

OTHER PUBLICATIONS

Zte et al., "Aspects of UL MIMO transmission", 3GPP TSG RAN WG1 NR Ad-Hoc Meeting, Spokane, USA, Jan. 16-20, 2017, total 5 pages, R1-1700118.

*Primary Examiner* — Betsy Deppe
(74) *Attorney, Agent, or Firm* — Kilpatrick Townsend & Stockton, LLP

(57) ABSTRACT

Disclosed are a method and device for determining an uplink transmission codebook. The method includes: transmitting by the terminal data transmission capability information to a base station, the data transmission capability information being used to characterize a data transmission capability that current antennas of the terminal can support; receiving by the terminal codebook indication information transmitted by the base station, the codebook indication information including codebook information used for indicating the terminal to perform uplink transmission, and/or information used for characterizing that the base station successfully decodes or (Continued)

fails to decode the data transmission capability information; and determining by the terminal the codebook corresponding to the uplink transmission, according to the codebook indication information.

20 Claims, 4 Drawing Sheets

(56) References Cited

U.S. PATENT DOCUMENTS

| | | | |
|---|---|---|---|
| 10,581,498 B2 * | 3/2020 | Jongren | ............... H04B 7/0634 |
| 2009/0238298 A1 | 9/2009 | Kim et al. | |
| 2012/0027113 A1 | 2/2012 | Gaal et al. | |
| 2012/0328031 A1 | 12/2012 | Pajukoski et al. | |

FOREIGN PATENT DOCUMENTS

| | | |
|---|---|---|
| CN | 102013904 A | 4/2011 |
| CN | 103081388 A | 5/2013 |
| CN | 105827359 A | 8/2016 |
| WO | 2012175812 A1 | 12/2012 |
| WO | 2015103752 A1 | 7/2015 |
| WO | WO 2016/048223 A1 * | 3/2016 |
| WO | 2016101460 A1 | 6/2016 |
| WO | WO 2019/101461 A1 * | 6/2016 |
| WO | 2016163841 A1 | 10/2016 |
| WO | 2016184344 A1 | 11/2016 |
| WO | 2017031672 A1 | 3/2017 |

* cited by examiner

```
┌─────────────────────────────────────────────────────────────────┐
│ transmitting, by a terminal, data transmission capability        │
│ information to a base station, the data transmission capability  │── 101
│ information being used for characterizing a data transmission    │
│ capability which may be supported by current antenna structures  │
│ of the terminal                                                  │
└─────────────────────────────────────────────────────────────────┘
                                 │
                                 ▼
┌─────────────────────────────────────────────────────────────────┐
│ receiving, by the terminal, codebook indication information      │
│ transmitted by the base station, the codebook indication         │── 102
│ information including codebook information used for indicating   │
│ the terminal to perform uplink transmission, and/or information  │
│ used for characterizing that the base station successfully       │
│ decodes or fails to decode the data transmission capability      │
│ information                                                      │
└─────────────────────────────────────────────────────────────────┘
                                 │
                                 ▼
┌─────────────────────────────────────────────────────────────────┐
│ determining, by the terminal, a codebook corresponding to the    │── 103
│ uplink transmission, on the basis of the codebook indication     │
│ information                                                      │
└─────────────────────────────────────────────────────────────────┘
```

Fig. 1

METHOD AND DEVICE FOR DETERMINING UPLINK TRANSMISSION CODEBOOK

The present application is a National Stage of International Application No. PCT/CN2018/095193, filed Jul. 10, 2018, which claims priority to Chinese Patent Application No. 201710686814.9, entitled "METHODS AND DEVICE FOR DETERMINING UPLINK TRANSMISSION CODEBOOK", filled to Patent Office of the People's Republic of China on Aug. 11, 2017, all of which are incorporated in the present application by reference.

FIELD

The present application relates to the technical field of communication and in particular relates to methods and a device for determining an uplink transmission codebook.

BACKGROUND

Space resources may be sufficiently utilized by using an MIMO (Multiple-Input Multiple-Output) technology which is to respectively use a plurality of transmitting antennas on a terminal and receiving antennas on an eNB (evolved Node B called base station below), so that transmission signals are transmitted and received by a plurality of antennas of the terminal and the base station, then, the system channel capacity may be increased multiply under the condition that spectrum resources and the antenna transmitting power are not increased, and furthermore, the communication quality is improved.

At present, in order to further increase the gain of communication quality improvement brought by the MIMO technology, a large-scale antenna technology is used in a 5G ($5^{th}$-Generation) mobile communication technology. The antennas of the base station may include a great number of antenna units and transceiving units, for example, the numbers of both the antenna units and the transceiving units may be 128, 256 or 512, an antenna array composed of the greater number of antenna units may also be configured in the terminal, and signals may be transmitted or received by virtue of the plurality of antennas of the base station and the terminal during communication, so that signal attenuation is reduced, and communication quality is improved. Generally speaking, an uplink transmission solution supporting codebooks or an uplink transmission solution supporting non-codebooks may be used in a 5G communication system.

The uplink transmission solution based on the codebook means that a plurality of codebooks are configured on the base station and the terminal, each of the codebooks includes a plurality of pre-coding matrixes, then, the pre-coding matrixes included by the codebooks are determined by the selected codebooks, and data transmission is performed by using the finally determined pre-coding matrixes. At present, the base station determines codebook information used by the terminal, according to an SRS (Sounding Reference Signal) resource reported by the terminal, and notifies the codebook information to the terminal, the terminal determines the corresponding codebooks according to the notification of the base station. However, at present, the base station only configures the codebooks according to the channel condition indicated by the SRS resource, but does not consider the current state of the terminal, and therefore, it is possible that the current state of the terminal is incapable of supporting the codebooks configured by the base station.

SUMMARY

Embodiments of the present application provide a method and device for determining an uplink transmission codebook, configured to determine a codebook used by a terminal in performing uplink transmission, on the basis of a current codebook support capability of the terminal, so as to improve the codebook support capability of the terminal.

On the first aspect, provided is a method for determining an uplink transmission codebook, and the method includes:
transmitting, by the terminal, data transmission capability information to a base station, the data transmission capability information being used for characterizing a data transmission capability which may be supported by current antennas of the terminal;
receiving, by the terminal, codebook indication information transmitted by the base station, the codebook indication information including codebook information used for indicating the terminal to perform uplink transmission, and/or information used for characterizing that the base station successfully decodes or fails to decode the data transmission capability information; and
determining, by the terminal, a codebook corresponding to the uplink transmission, on the basis of the codebook indication information.

Optionally, the data transmission capability information includes one or more pieces of the following information:
a quantity of panels which may be used by the terminal;
a quantity of transceiving units included in each of the panels;
a quantity of antenna ports included in each of the panels;
a quantity of transceiving units supported by the terminal;
a quantity of antenna ports supported by the terminal;
the maximum value of a quantity of the transceiving units included in each of the panels;
a quantity of antennas of the terminal;
state information used for indicating whether the terminal uses a polarizing antenna;
codebook type selection information used for indicating a type of a codebook;
codebook index selection information used for indicating an index of a codebook;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook; and
pre-coding matrix grouping information corresponding to a codebook.

Optionally, the codebook indication information includes one or more pieces of the following information:
codebook type selection information used for indicating a type of a codebook;
codebook index selection information used for indicating an index of a codebook;
a quantity of reference signal antenna ports configured for the terminal by the base station;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook;

pre-coding matrix grouping information corresponding to a codebook;
panel selection information used for indicating that one or more panels in the panels are selected; and
rank indication information.

Optionally, when the codebook indication information includes information used for characterizing that the base station successfully decodes or fails to decode the data transmission capability information, determining, by the terminal, the codebook corresponding to the uplink transmission, on the basis of the codebook indication information, includes:
when the codebook indication information includes the information used for characterizing that the base station successfully decodes the data transmission capability information, determining, by the terminal, a codebook corresponding to the data transmission capability information, on the basis of the data transmission capability information; or,
when the codebook indication information includes the information used for characterizing that the base station fails to decode the data transmission capability information, retransmitting, by the terminal, the data transmission capability information to the base station; or,
when the codebook indication information includes the information used for characterizing that the base station fails to decode the data transmission capability information, determining, by the terminal, to continue to use the codebook being used currently.

Optionally, the codebook indication information includes first indication information and second indication information, wherein the first indication information includes one or more pieces of the information included by the codebook indication information, and the second indication information includes one or more pieces of the information except the first indication information in the information included by the codebook indication information;
the method further includes:
receiving, by the terminal, the first indication information and the second indication information transmitted, by the base station, on different channels and/or at different moments; and
determining, by the terminal, the codebook corresponding to the uplink transmission, on the basis of the codebook indication information, includes:
determining, by the terminal, the codebook corresponding to the uplink information, on the basis of the first indication information and/or the second indication information.

Optionally, after determining by the terminal, the codebook corresponding to the uplink transmission, on the basis of the codebook indication information, the method further includes:
receiving, by the terminal, codebook update indication information transmitted by the base station, wherein the codebook update indication information is used for indicating the terminal to update or not update the codebook being used currently;
determining, by the terminal, whether to update the codebook being used currently, on the basis of the codebook update indication information;
redetermining, by the terminal, a codebook performing uplink data transmission if the terminal determines to update the codebook being used currently; or,
determining, by the terminal, to continue to use the codebook being used currently if the terminal determines not to update the codebook being used currently.

Optionally, after transmitting by the terminal, the data transmission capability information to the base station, the method further includes:
determining, by the terminal, whether the codebook indication information transmitted by the base station is received within a predefined time threshold;
determining, by the terminal, the codebook performing uplink data transmission, on the basis of the data transmission capability information, or determining, by the terminal, to continue to use the codebook being used currently if the terminal determines that the codebook indication information transmitted by the base station is not received within the predefined time threshold.

Optionally, the method further includes:
receiving, by the terminal, transmission pre-coding matrix indicator information transmitted by the base station, the transmission pre-coding matrix indicator information being used for indicating a pre-coding matrix in the codebook used by the terminal; and
determining, by the terminal, the pre-coding matrix for data transmission according to the codebook corresponding to the uplink transmission and the transmission pre-coding matrix indicator information, and performing data transmission by using the pre-coding matrix.

On the second aspect, provided is a method for determining an uplink transmission codebook, and the method includes:
receiving, by a base station, data transmission capability information transmitted by a terminal, the data transmission capability information being used for characterizing a data transmission capability which may be supported by current antennas of the terminal;
decoding, by the base station, the data transmission capability information, and determining codebook indication information according to a decoding result, the codebook indication information being used for indicating a codebook enabling the terminal to perform uplink transmission, or the codebook indication information being used for characterizing confirmation information that the base station successfully decodes or fails to decode the data transmission capability information; and
transmitting, by the base station, the codebook indication information to the terminal.

Optionally, the method further includes:
receiving, by the base station, an uplink reference signal transmitted by the terminal;
decoding, by the base station, the data transmission capability information, and determining the codebook indication information according to the decoding result, includes:
measuring, by the base station, the uplink reference signal, and generating the codebook indication information on the basis of a measurement result and the decoding result.

Optionally, the codebook indication information includes one or more pieces of the following information:
codebook type selection information used for indicating a type of a codebook;
codebook index selection information used for indicating an index of a codebook;
a quantity of reference signal antenna ports configured for the terminal by the base station;
a quantity of antennas corresponding to a codebook;
structures of the antennas corresponding to a codebook;

sampling rates corresponding to a codebook;
a phase rotation factor among the antennas corresponding to a codebook;
power factor indication information corresponding to a codebook;
pre-coding matrix grouping information corresponding to a codebook;
panel selection information used for indicating that one or more panels in the panels are selected; and
rank indication information.

Optionally, the codebook indication information includes first indication information and second indication information, wherein the first indication information includes one or more pieces of the information included by the codebook indication information, and the second indication information includes one or more pieces of the information except the first indication information in the information included by the codebook indication information;
  transmitting, by the base station, the codebook indication information to the terminal, includes:
  transmitting, by the base station, the first indication information and the second indication information to the terminal on different channels and/or different moments.

Optionally, after receiving by the base station, the data transmission capability information transmitted by the terminal, the method further includes:
  determining, by the base station, whether the codebook being used currently by the terminal is required to be updated, on the basis of the data transmission capability information;
  generating, by the base station, codebook update indication information on the basis of a determination result, and the codebook update indication information being used for indicating the terminal to update or not update the codebook being used currently; and
  transmitting, by the base station, the codebook update indication information to the terminal.

Optionally, the base station transmits the codebook indication information or the codebook update indication information to the terminal through a semistatic signaling or a dynamic signaling.

Optionally, the method further includes: transmitting, by the base station, transmission pre-coding matrix indicator information to the terminal, the transmission pre-coding matrix indicator information being used for indicating a pre-coding matrix corresponding to the uplink transmission of the terminal in the codebook corresponding to the codebook indication information.

On the third aspect, provided is a terminal including:
a first transmitting unit, configured to transmit data transmission capability information to a base station, the data transmission capability information being used for characterizing a data transmission capability which may be supported by current antennas of the terminal;
a first receiving unit, configured to receive codebook indication information transmitted by the base station, the codebook indication information including codebook information for indicating the terminal to perform uplink transmission, and/or information used for characterizing that the base station successfully decodes or fails to decode the data transmission capability information;
a first determining unit, configured to determine a codebook corresponding to the uplink transmission, on the basis of the codebook indication information.

Optionally, the data transmission capability information includes one or more pieces of the following information:
  a quantity of panels which may be used by the terminal;
  a quantity of transceiving units included in each of the panels;
  a quantity of antenna ports included in each of the panels;
  a quantity of transceiving units supported by the terminal;
  a quantity of antenna ports supported by the terminal;
  the maximum value of a quantity of the transceiving units included in each of the panels;
  a quantity of antennas of the terminal;
  state information used for indicating whether the terminal uses a polarizing antenna;
  information of spatial correlation among different panels in the panels;
  information of spatial correlation among the transceiving units included in the different panels;
  information of spatial correlation among the transceiving units included in each of the panels;
  codebook type selection information used for indicating a type of a codebook;
  codebook index selection information used for indicating an index of a codebook;
  a quantity of antennas corresponding to a codebook;
  structures of the antennas corresponding to a codebook;
  sampling rates corresponding to a codebook;
  a phase rotation factor among the antennas corresponding to a codebook;
  power factor indication information corresponding to a codebook; and
  pre-coding matrix grouping information corresponding to a codebook.

Optionally, the codebook indication information includes one or more pieces of the following information:
  codebook type selection information used for indicating a type of a codebook;
  codebook index selection information used for indicating an index of a codebook;
  a quantity of reference signal antenna ports disposed for the terminal by the base station;
  a quantity of antennas corresponding to a codebook;
  structures of the antennas corresponding to a codebook;
  sampling rates corresponding to a codebook;
  a phase rotation factor among the antennas corresponding to a codebook;
  power factor indication information corresponding to a codebook;
  pre-coding matrix grouping information corresponding to a codebook;
  panel selection information used for indicating to select one or more panels in the panels; and
  rank indication information.

Optionally, the first determining unit is further configured to: when the codebook indication information includes the information used for characterizing that the base station successfully decodes the data transmission capability information, determine a codebook corresponding to the data transmission capability information, on the basis of the data transmission capability information; or, when the codebook indication information includes the information used for characterizing that the base station fails to decode the data transmission capability information, determine to continue to use the codebook being used currently; and
the first transmitting unit is further configured to: when the codebook indication information includes the information used for characterizing that the base station fails to decode the data transmission capability information, retransmit the data transmission capability information to the base station.

Optionally, the codebook indication information includes first indication information and second indication information, wherein the first indication information includes one or more pieces of the information included by the codebook indication information, and the second indication information includes one or more pieces of information except the first indication information in the information included by the codebook indication information;

the first receiving unit is further configured to receive the first indication information and the second indication information transmitted, by the base station, on different channels and/or at different moments; and the first determining unit is configured to determine the codebook corresponding to the uplink transmission, on the basis of the codebook indication information, by:

determining the codebook corresponding to the uplink information, on the basis of the first indication information and/or the second indication information.

Optionally, the first receiving unit is further configured to receive codebook update indication information transmitted by the base station, wherein the codebook update indication information is used for indicating the terminal to update or not update the codebook being used currently;

the first determining unit is further configured to determine whether to update the codebook being used currently, on the basis of the codebook update indication information, redetermine a codebook performing uplink data transmission if the codebook being used currently is determined to be updated; or, determine to continue to use the codebook being used currently if the codebook being used currently is determined not to be updated.

Optionally, the first determining unit is further configured to determine whether the codebook indication information transmitted by the base station is received within a predefined time threshold, determine the codebook performing uplink data transmission, on the basis of the data transmission capability information, or determine to continue to use the codebook being used currently if the codebook indication information transmitted by the base station is determined not to be received within the predefined time threshold.

Optionally, the first receiving unit is further configured to receive transmission pre-coding matrix indicator information transmitted by the base station; the transmission pre-coding matrix indicator information is used for indicating a pre-coding matrix in the codebook used by the terminal; and the first determining unit is further configured to determine the pre-coding matrix for data transmission according to the codebook corresponding to the uplink transmission and the transmission pre-coding matrix indicator information, and performing data transmission by using the pre-coding matrix.

On the fourth aspect, provided is a base station including:

a second receiving unit, configured to receive data transmission capability information transmitted by a terminal, the data transmission capability information being used for characterizing a data transmission capability which may be supported by current antennas of the terminal;

a decoding unit, configured to decode the data transmission capability information and determine codebook indication information according to a decoding result, the codebook indication information being used for indicating a codebook enabling the terminal to perform uplink transmission, or the codebook indication information being used for characterizing confirmation information that the base station successfully decodes or fails to decode the data transmission capability information; and a second transmitting unit, configured to transmit the codebook indication information to the terminal.

Optionally, the second receiving unit is further configured to receive an uplink reference signal transmitted by the terminal; and the decoding unit is further configured to measure the uplink reference signal and determining the codebook indication information on the basis of a measurement result and the decoding result.

Optionally, the codebook indication information includes one or more pieces of the following information:

codebook type selection information used for indicating a type of a codebook;

codebook index selection information used for indicating an index of a codebook;

a quantity of reference signal antenna ports configured for the terminal by the base station;

a quantity of antennas corresponding to a codebook;

structures of the antennas corresponding to a codebook;

sampling rates corresponding to a codebook;

a phase rotation factor among the antennas corresponding to a codebook;

power factor indication information corresponding to a codebook;

pre-coding matrix grouping information corresponding to a codebook;

panel selection information used for indicating that one or more panels in the panels are selected; and rank indication information.

Optionally, the codebook indication information includes first indication information and second indication information, wherein the first indication information includes one or more pieces of the information included by the codebook indication information, and the second indication information includes one or more pieces of the information except the first indication information in the information included by the codebook indication information;

the second transmitting unit is configured to transmit the codebook indication information to the terminal, by:

transmitting the first indication information and the second indication information to the terminal on different channels and/or different moments.

Optionally, the base station further includes a second determining unit;

the second determining unit is configured to determine whether the codebook being used currently by the terminal is required to be updated, on the basis of the data transmission capability information;

the decoding unit is further configured to generate codebook update indication information on the basis of a determination result, the codebook update indication information is used for indicating the terminal to update or not update the codebook being used currently; and the second transmitting unit is further configured to transmit the codebook update indication information to the terminal.

Optionally, the second transmitting unit is further configured to transmit the codebook indication information or the codebook update indication information to the terminal through a semistatic signaling or a dynamic signaling.

Optionally, the second transmitting unit is further configured to transmit transmission pre-coding matrix indicator information to the terminal; and the transmission pre-coding matrix indicator information is used for indicating a pre-coding matrix corresponding to the uplink transmission of the terminal in the codebook corresponding to the codebook indication information.

On the fifth aspect, provided is a computer apparatus including a processor, the processor is configured to implement the steps of any one of the method for determining the uplink transmission codebook provided on the first aspect and the method for determining the uplink transmission codebook provided on the second aspect when executing a computer program stored in a memory.

On the sixth aspect, provided is a computer readable storage medium storing a computer program, and the computer program performs the steps of any one of the method for determining the uplink transmission codebook provided on the first aspect and the method for determining the uplink transmission codebook provided on the second aspect when executed by a processor.

In the embodiments of the present application, the terminal may report the current data transmission capability information of the terminal to the base station, so that a codebook suitable for the current situation of the terminal may be determined according to the current data transmission capability information of the terminal or the terminal is notified to voluntarily determine the codebook according to the current situation of the terminal when the base station determines the codebook, in this way, either the codebook selected by the base station or the codebook voluntarily determined by the terminal conforms to the current actual situation of the terminal and conforms to the current codebook support capability of the terminal, namely the current state of the terminal is sufficient to support the used codebook, and thus, the communication experience quality of a user may be better.

BRIEF DESCRIPTION OF THE DRAWINGS

In order to more clearly describe the technical solutions of the embodiments of the present application, accompanying drawings required to be used in the embodiments of the present application will be briefly introduced below, obviously, the accompanying drawings introduced below are only some embodiments of the present application, the ordinary skilled in the art can also obtain other accompanying drawings according to the accompanying drawings on the premise that no creative work is provided.

FIG. 1 is a schematic flow diagram of a method for determining an uplink transmission codebook, provided by an embodiment of the present application;

DETAILED DESCRIPTION OF THE EMBODIMENTS

Figure 2:
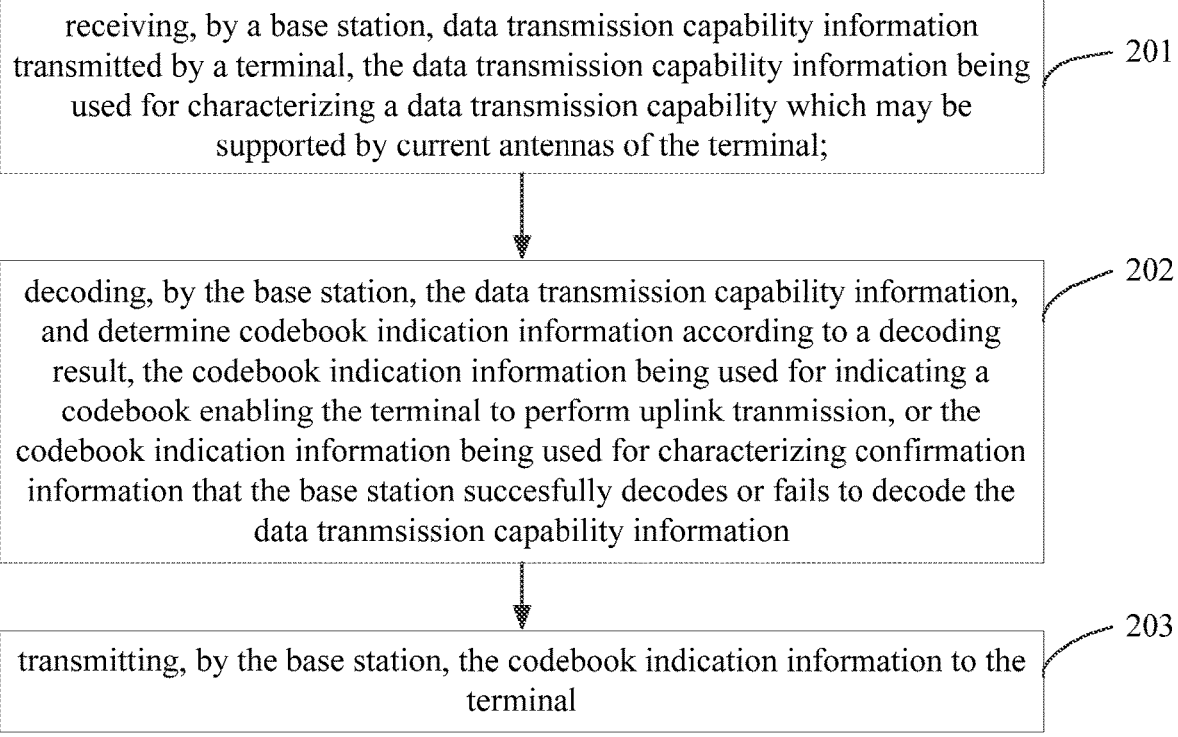
FIG. 2 is a schematic flow diagram of a method for determining an uplink transmission codebook, provided by an embodiment of the present application.

In order to make the purposes, technical solutions and advantages of the embodiments of the present application clearer, the technical solutions in embodiments of the present application will be clearly and completely described in combination with accompanying drawings in embodiments of the present application.

The technical background of the embodiments of the present application is introduced below.

At present, for an uplink transmission solution based on a codebook, a base station determines codebook information used by a terminal, according to an SRS (Sounding Reference Signal) resource reported by the terminal, and notifies the codebook information to the terminal, the terminal determines the corresponding codebooks according to the notification of the base station. However, at present, the base station only configures the codebooks according to a channel condition indicated by the SRS resource, but does not consider the current state of the terminal, and therefore, it is possible that the current state of the terminal is incapable of supporting the codebooks configured by the base station, which results in the situation that the communication process cannot be normally performed, and therefore, the experience quality of a user is poor.

For the reason, an embodiment of the present application provides a method for determining an uplink transmission codebook. In the method, the terminal may report the current data transmission capability information of the terminal to the base station, so that a codebook suitable for the current situation of the terminal may be determined according to the current data transmission capability information of the terminal or the terminal is notified to voluntarily determine the codebook according to the current situation of the terminal when the base station determines the codebook. In this way, either the codebook selected by the base station or the codebook voluntarily determined by the terminal conforms to the current actual situation of the terminal and conforms to the current codebook support capability of the terminal, and thus, the communication experience quality of the user may be better.

The technical solutions provided by the embodiments of the present application are introduced below in combination with the accompanying drawings.

Referring to FIG. 1, an embodiment of the present application provides a method for determining an uplink transmission codebook, and the processes of the method are described as follows. The method may be executed by a terminal provided by an embodiment of the present application, and meanwhile, the processes of the method for determining the uplink transmission codebook at a base station side may also be related in the following description.

Step 101: the terminal transmits data transmission capability information to a base station, the data transmission capability information is used for characterizing a data transmission capability which may be supported by current antennas of the terminal.

Step 102: the terminal receives codebook indication information transmitted by the base station, the codebook indication information is used for indicating a codebook enabling the terminal to perform uplink transmission, or the codebook indication information is used for characterizing that the base station successfully decodes or fails to decode the data transmission capability information.

Step 103: the terminal determines a codebook corresponding to the uplink transmission, on the basis of the codebook indication information.

In the embodiment of the present application, before the communication between the terminal and the base station starts, the base station and the terminal may specify or configure one or more codebooks in advance. For example, the terminal configures different codebooks when different structures of antennas are provided. The antennas in the terminal may be selectively turned off or on according to the service condition of the terminal. For example, some of the antennas may be selected to be turned off when the terminal detects that the electric quantity is insufficient. In this way, the electric quantity required to be used when the antennas work may be reduced, and therefore, a power saving effect is achieved. In this way, the structures of the antennas of the terminal may be changed after some antennas are turned off.

In the embodiment of the present application, the terminal may transmit the data transmission capability information to the base station, and the data transmission capability information is used for characterizing the data transmission capability which may be supported by the current antennas of the terminal. When the structures of the antennas of the terminal are different, the data transmission support capabilities are also different, and therefore, the data transmission capability information may be the current structures of the antennas of the terminal. Specifically, the terminal may transmit the current data transmission capability information to the base station after the structures of the antennas are changed; or the terminal may also periodically transmit the data transmission capability information to the base station. Of course, in a specific application, the data transmission capability information may also be transmitted in other possible ways. There are no limits to this in the present application.

The data transmission capability information transmitted by the terminal may include, but not be limited to one or more pieces of the following information:

(1) the number of panels which may be used by the terminal. The panels refer to a group of antennas in the terminal. For example, the panels may be a set of antennas located on the same plane, a set of antennas with the same direction, a set of antennas corresponding to the same radio frequency channel, a group of antennas corresponding to a plurality of radio frequency channels or a set of a group of TRUs or TXRUs (Transceiving Units) with the same or similar characteristic or antenna units. For example, the TRUs (antenna units) in the same panel have the same simulated transmitting wave beam, the TRUs in one panel have a certain relevance and the like, or the TRUs (antenna units) in the same panel use the transmitting wave beam in the same wave beam group and the like;

(2) The number of transceiving units included in each panel. One transceiving unit may be connected with one antenna unit or connected with a plurality of antenna units;

(3) The number of antenna ports included in each panel;

(4) The number of transceiving units supported by the terminal. The number of the transceiving units supported by the terminal is related to the performance of the terminal and may also be related to the current structures of the antennas of the terminal. For example, if the number of the antennas currently turned on by the terminal is relatively small, then, the number of the corresponding transceiving units which may be supported is also relatively small. The number of the transceiving units supported by the terminal may be the total number of the transceiving units, the number of transceiving units with a vertical dimension, the number of transceiving units with a horizontal dimension or the total number of the transceiving units with the vertical dimension and the transceiving units with the horizontal dimension;

(5) The number of antenna ports supported by the terminal. The number of the transceiving units supported by the terminal is related to the performance of the terminal and may also be related to the current structures of the antennas of the terminal. The number of antenna ports supported by the terminal may be the total number of the antenna ports, the number of antenna ports with a vertical dimension, the number of antenna ports with a horizontal dimension or the total number of the antenna ports with the vertical dimension and the number of the antenna ports with the horizontal dimension;

(6) The maximum value of the number of the transceiving units included in each of the panels. Each terminal may include a plurality of panels, each panel may include a plurality of transceiving units, the number of the transceiving units included in the different panels is possible to be same or different, and therefore, the maximum value of the number of the transceiving units included in each of the panels refers to the maximum value of the number of the transceiving units included in the plurality of panels;

(7) The number of antennas of the terminal. The number of the antennas of the terminal may be the total number of the antennas, the number of antennas with vertical dimensions, the number of antennas with horizontal dimensions or the total number of the antennas with the vertical dimensions and the number of the antennas with the horizontal dimensions;

(8) State information used for indicating whether the terminal uses a polarizing antenna. For example, the state information may be 1 when the polarizing antenna is used in the terminal; and the state information may be 0 if the polarizing antenna is not used in the terminal;

(9) Information of spatial correlation among different panels in the panels. For example, the plurality of codebooks configured for the terminal respectively correspond to the structures of the antennas with different information of spatial correlation. The information of the spatial correlation among the panels corresponding to the structures of the antennas of the terminal, transmitted to the base station by the terminal, has high correlation, medium correlation and low correlation, so that the base station may determine the codebook used by the terminal in performing uplink transmission according to the information of the spatial correlation. Or, the terminal may also transmit a distance among the panels corresponding to the structures of the antennas of the terminal to the base station, the base station may determine the information of the spatial correlation among the different panels of the terminal according to the distance. The spatial correlation may be spatial correlation with the same dimension or spatial correlation with multiple dimensions. The dimension may be a vertical dimension and/or a horizontal dimension;

(10) Information of spatial correlation among the transceiving units included in the different panels. The information of the spatial correlation among the transceiving units may also have high correlation, medium correlation and low correlation. Or, the terminal may also transmit a distance among the transceiving units included by the different panels to the base station, the base station may determine the information of the spatial correlation among the transceiving units included by the different panels according to the distance. The spatial correlation may be spatial correlation with the same dimension or spatial correlation with multiple dimensions. The dimension may be a vertical dimension and/or a horizontal dimension;

(11) Information of spatial correlation among the transceiving units included in each of the panels;

(12) Codebook type selection information used for indicating types of codebooks. For example, the terminal and the base station specify various types of codebooks or agreements or various types of configurable codebooks. The terminal determines a type of a codebook which may be used by uplink transmission according to the data transmission capability information and/or channel measurement information which may be, for example, channel measurement for a downlink reference signal, then, type selection information for indicating the types is transmitted to the base station, and the base station may specify one or more types, for the uplink transmission of the terminal, from the types. For example, the terminal and the base station specify a type-1 codebook, a type-2 codebook and a type-3 codebook, and different types of codebooks correspond to a group of codebooks. The terminal may determine to use the type-1 codebook according to the data transmission capability information of the terminal, then, one piece of codebook type selection information is transmitted to the base station to notify the base station to use the type-1 codebook. The codebook type selection information may be determined by the terminal according to the positions of the antennas of the terminal or the correlation among the antennas;

(13) Codebook index selection information used for indicating an index of the codebooks. When the terminal and the base station specify various types of codebooks or specify various codebooks, the terminal may also determine an index of one or more codebooks according to the data transmission capability information of the terminal and transmit the index to the base station so that the index is confirmed by the base station;

(14) The number of antennas corresponding to the codebooks. The number of the antennas corresponding to the codebooks may be the total number of the antennas, the number of antennas with vertical dimensions, the number of antennas with horizontal dimensions, or the total number of the antennas with the vertical dimensions and the antennas with the horizontal dimensions;

(15) Sampling rates corresponding to the codebooks. The sampling rates may be oversampling rates so as to generate more pre-coding matrixes. The terminal may perform data transmission in both directions corresponding to the antennas of the terminal and other directions except the directions corresponding to the antennas of the terminal, and the oversampling rates are values used for characterizing the number of other directions. The sampling rates may also be sub-sampling rates used for removing some precodes from a group of a greater number of pre-coding matrixes. For example, the base station and the terminal specify the generation ways of some pre-coding matrixes, and the generation ways correspond to a certain number of pre-coding matrixes. Due to the configuration of the sampling rates, more pre-coding matrixes may be generated or a part of pre-coding matrixes may be selected on this basis. The terminal may determine a sampling rate corresponding to one or a group of codebooks, on the basis of the current antennas of the terminal, or is configured to determine the sampling rates of the codebooks and transmitting the sampling rates to the base station. The sampling rates may have vertical dimensions or horizontal dimensions or full dimensions. Then, after receiving the sampling rates, the base station may determine the corresponding codebooks according to the sampling rates;

(16) A phase rotation factor among the antennas corresponding to the codebooks. The phase rotation factor among the antennas corresponds to information for determining phase rotation among the antennas. The phase rotation factor among the antennas may be a definite value, a set of a group of numbers, indication information for indicating the specific phase rotation or indication information for indicating a set of phases of phase rotation of the antennas. The terminal may also determine the phase rotation factor among the antennas corresponding to one or a group of codebooks, on the basis of the current structures of the antennas of the terminal, and transmit the phase rotation factor to the base station, so that the base station determines an uplink codebook according to the phase rotation factor. Or, the terminal and the base station specify phase selection factors among antennas in one or more groups of codebooks by agreement, the terminal determines one or more groups of phase selection factors supported or tended by the terminal, on the basis of the current structures of the antennas of the terminal, and transmits the phase selection factors to the base station;

(17) Power factor indication information corresponding to the codebooks. The power factor indication information is correspondingly configured to determine information of power among the antennas in the codebooks. The power factor indication information may be a determined numerical value, a set of a group of numbers, indication information for indicating specific power or a power difference, or indication information for indicating a set of the power or the power difference. The terminal may determine the power factor indication information of the antennas corresponding to one or more codebooks, on the basis of the current structures of the antennas of the terminal and/or the data transmission capability corresponding to the antennas, and transmit the power factor indication information to the base station, so that the base station determines an uplink codebook according to the power factor indication information;

(18) Pre-coding matrix grouping information corresponding to the codebooks. The pre-coding matrix grouping information may include one or more pieces of number information of precode groups, number information of precodes in the precode groups, information of a spacing among the precodes in each precode group and information of a spacing among the precode groups. The terminal may determine codebook grouping information such as the number information of the precode groups, the number information of the precodes in the precode groups, the information of the spacing among the precodes in each precode group and the information of the spacing among the precode groups when a two-level or multi-level codebook structure exists, on the basis of the current antennas of the terminal. For example, if the terminal determines to use the two-level codebook structure, the codebook grouping information may include the number of precodes included in the precode groups corresponding to a first-level codebook and a second-level codebook, spacing information corresponding to vectors of the precodes in the precode groups, spacing information among the vectors of the precodes among the groups and the like;

(19) Structures of the antennas corresponding to the codebooks. For example, the structures of the antennas include two dimensions and are the number of the antennas respectively included in the two dimensions. For example, the dimensions are a vertical dimension and a horizontal dimension, and the structures of the antennas are the number of antennas with the vertical dimension and the number of antennas with the horizontal dimension. Of course, the data transmission capability information may also be other possible parameter information in the terminal, and is not limited in the present application.

Specifically, the data transmission capability information transmitted to the base station by the terminal may further include a plurality of parts, for example, the data transmission capability information may include first capability information and second capability information, wherein the first capability information may be one or more pieces of the information included by the above-mentioned data transmission capability information, and the second capability information may be one or more pieces of remaining information except the first capability information in the information included by the above-mentioned data transmission capability information. Of course, the data transmission capability information is not limited to include two parts of information, may also include three parts or more parts of grouped information, may be specifically and reasonably set according to an actual application, but is not limited in the embodiment of the present application.

When the data transmission capability information transmitted to the base station by the terminal includes the plurality of parts, the terminal may respectively transmit the plurality of parts of capability information to the base station by using the same or different channels at the same or different moments.

In the embodiment of the present application, the terminal may transmit the current antenna information of the terminal to the base station, or the terminal determines one or more usable codebooks according to the current antennas of the terminal and transmits the determined codebooks or one or more pieces of information corresponding to the codebooks to the base station. If the information received by the base station is the current antenna information of the terminal, the base station may determine the one or more codebooks according to the antenna information and transmit the codebooks and the one or more pieces of information corresponding to the codebooks to the terminal; and if the information received by the base station is the codebooks determined by the terminal or the one or more pieces of information corresponding to the codebooks, the base station may feed back a piece of confirmation information to the terminal to indicate whether the terminal uses the codebooks determined by the terminal, or the base station may also specify one codebook for the terminal.

In the embodiment of the present application, after the base station may receive the data transmission capability information transmitted by the terminal, the base station may decode the data transmission capability information so as to obtain the current antenna structure information, included in the data transmission capability information, of the terminal, namely the base station may know the current data transmission capability of the terminal. After the base station knows the current data transmission capability of the terminal, the following two implementation ways are included, but are not limited.

The first implementation way is that: after the base station knows the current data transmission capability of the terminal, the base station may determine a codebook suitable for a current state of the terminal, one the basis of the current data transmission capability of the terminal, wherein corresponding relations between different codebooks and different data transmission capabilities may be pre-stored in the base station. Then, the base station may determine the codebook suitable for the current state of the terminal according to the corresponding relations. For example, one of the corresponding relations stored in the base station may be a codebook corresponding to the index 1 when the number of the antenna ports included by the terminal is M.

After the base station determines the codebook suitable for the current state of the terminal, the base station may generate codebook indication information according to a determination result, the codebook indication information is used for indicating the codebook determined for the terminal by the base station and used for uplink transmission. Specifically, the codebook indication information may include, but be not limited to one or more pieces of the following information.

(1) Codebook type selection information used for indicating types of codebooks. The codebook type selection information is used for indicating the type to which the codebooks determined for the terminal by the base station belongs, one type may include one or more codebooks, then, the terminal may select one codebook belonging to the type to perform data transmission, the one mentioned herein may be any one or may be determined in combination with other information included in the codebook indication information transmitted by the base station. Optionally, the terminal selects a codeword corresponding to the type from codebooks pre-specified by the base station and the terminal according to the type indication information to form a novel codeword used as a codebook for data transmission.

For example, the codebooks pre-specified by the base station and the terminal is shown as the following table:

| Codeword symbol | Codeword | | | |
|---|---|---|---|---|
| 1-4 | Codeword 1 | Codeword 2 | Codeword 3 | Codeword 4 |
| 5-8 | Codeword 5 | Codeword 6 | Codeword 7 | Codeword 8 |
| 9-11 | Codeword 9 | Codeword 10 | Codeword 11 | Codeword 12 |

The codebook type selection information indicated for the terminal by the base station includes three types: type 1, type 2 and type 3.

When the base station indicates the type 1 for the terminal, the codebook corresponding to the type 1 in the codebooks pre-specified by the base station and the terminal includes all codewords, namely the codebook corresponding to the type 1 and determined by the terminal is:

| Codeword 1 | Codeword 2 | Codeword 3 | Codeword 4 |
|---|---|---|---|
| Codeword 5 | Codeword 6 | Codeword 7 | Codeword 8 |
| Codeword 9 | Codeword 10 | Codeword 11 | Codeword 12 |

When the base station indicates the type 2 for the terminal, the codebook corresponding to the type 2 in the codebooks pre-specified by the base station and the terminal includes codewords with codeword symbols ranging from 5 to 12, namely the codebook corresponding to the type 2 and determined by the terminal is:

| Codeword 5 | Codeword 6 | Codeword 7 | Codeword 8 |
|---|---|---|---|
| Codeword 9 | Codeword 10 | Codeword 11 | Codeword 12 |

When the base station indicates the type 3 for the terminal, the codebook corresponding to the type 3 in the codebooks pre-specified by the base station and the terminal includes codewords with codeword symbols ranging from 9 to 12, namely the codebook corresponding to the type 3 and determined by the terminal is:

| Codeword 9 | Codeword 10 | Codeword 11 | Codeword 12 |
|---|---|---|---|

For another example, the codebooks pre-specified by the base station and the terminal are that: a codebook used during single-stream transmission at two antenna ports is shown as table 1, and a codebook used during two-stream transmission at the two antenna ports is shown as table 2.

TABLE 1

Codebook Used During Single-Stream Transmission at Two Antenna Ports and Pre-specified by Base Station and Terminal

| Codeword symbol | Codeword | | | |
|---|---|---|---|---|
| 1-4 | Codeword 1-1 | Codeword 1-2 | Codeword 1-3 | Codeword 1-4 |
| 5-8 | Codeword 1-5 | Codeword 1-6 | Codeword 1-7 | Codeword 1-8 |

TABLE 2

Codebook Used During Two-Stream Transmission at Two Antenna Ports and Pre-specified by Base Station and Terminal

| Codeword symbol | Codeword | |
|---|---|---|
| 1-2 | Codeword 2-1 | Codeword 2-2 |
| 3 | Codeword 2-3 | — |

The codebook type selection information indicated for the terminal by the base station includes two parts, the first part is a maximum transmission stream number, and the second part is two codebook types: type 1 and type 2, wherein during single-stream transmission at the two antenna ports, codewords corresponding to type 1 include codewords ranging from 1-1 to 1-8, and codewords corresponding to type 2 include codewords ranging from 1-5 to 1-8; and during two-stream transmission at the two antenna ports, codewords corresponding to type 1 include codewords ranging from 2-1 to 2-3, and codewords corresponding to type 2 include a codeword 2-3. When the codebook type selection information indicated for the terminal by the base station is that: the maximum transmission stream number is 1 and the type 1 is selected, a codebook used for data transmission and determined by the terminal is:

| Codeword 1-1 | Codeword 1-2 | Codeword 1-3 | Codeword 1-4 |
|---|---|---|---|
| Codeword 1-5 | Codeword 1-6 | Codeword 1-7 | Codeword 1-8 |

When the codebook type selection information indicated for the terminal by the base station is that: the maximum transmission stream number is 1 and the type 2 is selected, a codebook used for data transmission and determined by the terminal is:

| Codeword 1-5 | Codeword 1-6 | Codeword 1-7 | Codeword 1-8 |
|---|---|---|---|

When the codebook type selection information indicated for the terminal by the base station is that: the maximum transmission stream number is 2 and the type 1 is selected, a codebook used for data transmission and determined by the terminal is:

| Codeword 1-1 | Codeword 1-2 | Codeword 1-3 | Codeword 1-4 |
|---|---|---|---|
| Codeword 1-5 | Codeword 1-6 | Codeword 1-7 | Codeword 1-8 |
| Codeword 2-1 | Codeword 2-2 | Codeword 2-3 | |

When the codebook type selection information indicated for the terminal by the base station is that: the maximum transmission stream number is 2 and the type 2 is selected, the codebook used for data transmission and determined by the terminal is:

| Codeword 1-5 | Codeword 1-6 | Codeword 1-7 | Codeword 1-8 |
|---|---|---|---|
| Codeword 2-3 | | | |

(2) Codebook index selection information for indicating an index of the codebooks. In order to facilitate codebook management, a plurality of codebooks may be numbered, and the index of the same codebooks in the terminal and the base station are required to be same. Then, the codebook index selection information is used for indicating the index of the codebook determined for the terminal by the base station, and thus, the codebook used for performing uplink data transmission may be directly determined according to an index specified by the codebook index selection information after the terminal receives the codebook index selection information.

(3) The number of reference signal antenna ports configured for the terminal by the base station. The base station may also not directly notify the type or specific index of the codebook determined for the terminal to the terminal. Then, the base station may notify the number of the antenna ports corresponding to the codebook determined for the terminal to the terminal, and thus, the terminal may determine the codebook used for performing uplink data transmission, according to the corresponding relation between the number and the codebook after the terminal receives the number of the reference signal antenna ports configured for the terminal by the base station. Specifically, the antennas in the terminal may include antennas with different dimensions, for example, antennas with vertical dimensions and antennas with horizontal dimensions. Correspondingly, the antenna ports may also include antenna ports with vertical dimensions and antenna ports with horizontal dimensions, that is, the number of the antenna ports herein may be the total number of the antenna ports or the number of the antenna ports with different dimensions, such as the number of the antenna ports with the vertical dimensions and the number of the antenna ports with the horizontal dimensions.

(4) The number of antennas corresponding to the codebooks. The base station may notify the codebook determined for the terminal to the terminal in a way of transmitting the number of the antennas corresponding to the codebooks, then, after receiving the number of the antennas, the terminal may determine the codebook for performing uplink data transmission according to the corresponding relation between the number of the antennas and the codebook. Specifically, the number of the antennas may be the total number of the antennas or the number of antennas with different dimensions, such as the number of antennas with vertical dimensions and the number of antennas with horizontal dimensions.

(5) Sampling rates corresponding to the codebooks. The sampling rates may be oversampling rates so as to generate more pre-coding matrixes. In this way, the terminal may perform data transmission in both directions corresponding to the antennas of the terminal and other directions except the directions corresponding to the antennas of the terminal, and the oversampling rates are values used for characterizing the number of other directions. The sampling rates may also be sub-sampling rates used for removing some precodes from a group of a greater number of pre-coding matrixes. For example, the base station and the terminal specify the generation ways of some pre-coding matrixes, and the generation ways correspond to a certain number of pre-coding matrixes. Due to the configuration of the sampling rates for the terminal by the base station, more pre-coding matrixes may be generated or a part of pre-coding matrixes may be selected on this basis. The base station may notify the codebook determined for the terminal to the terminal in a way of transmitting a sampling rate corresponding to the codebook, then, after receiving the sampling rate, the terminal may determine the codebook for performing uplink data transmission according to a corresponding relation between the sampling rate and the codebook.

(6) A phase rotation factor among the antennas corresponding to the codebooks. The phase rotation factor among the antennas corresponds to information for determining phase rotation among the antennas. The phase rotation factor among the antennas may be a definite value, a set of a group of numbers, indication information for indicating the specific phase rotation or indication information for indicating a set of phases of phase rotation of the antennas.

(7) Panel selection information used for indicating that one or more panels in the panels are selected. The panel selection information may be information of a panel selected by the base station or an SRI (SRS resource index). The panel selection information may also be a pre-coding indication information for indicating the panel selected for the terminal by the base station. The panel selection information may also be transmitted to the terminal in a bitmap way, for example, the base station selects one or more panels for the terminal, each panel may use 1 bit to encode. When the corresponding bit of the panel is 1, it means that the base station selects the panel for the terminal. For example, when the terminal includes four panels and a bitmap transmitted to the terminal by the base station is 1101, it means that the indexes of panels selected for the terminal by the base station are 0, 1 and 3, while the panel with the index 2 is not selected.

(8) RI (Rank Indication) information. The RI information is used for indicating a rank configured for the terminal by the base station during uplink transmission. After receiving the RI information, the terminal may determine a codebook corresponding to the RI information according to the RI information or comprehensively determine the corresponding codebook according to the RI information and other information. The RI information herein is not only configured to determine the codebook, but also configured to determine the data stream number configured for the terminal by the base station.

(9) Power factor indication information in the codebooks. The power factor indication information is correspondingly configured to determine information of power among the antennas in the codebooks. The power factor indication information may be a definite value, a set of a group of numbers, indication information for indicating the specific phase rotation or indication information for indicating a set of phases of phase rotation of the antennas. After receiving the power factor indication information, the terminal may know how to determine the power among the antennas in the codebooks and determine a codebook according to the power.

(10) Pre-coding matrix grouping information corresponding to the codebooks. The pre-coding matrix grouping information may include one or more pieces of number information of precode groups, number information of precodes in the precode groups, information of a spacing among the precodes in each precode group and information of a spacing among the precode groups. After receiving the pre-coding matrix grouping information, the terminal determines pre-coding matrix grouping situations corresponding to the codebooks and then may determine information of the codebooks in combination with the pre-coding indication information and/or the RI information transmitted by the base station.

(11) Structures of the antennas corresponding to the codebooks. For example, the structures of the antennas include two dimensions and are numbers of antennas respectively included in the two dimensions. For example, the dimensions are a vertical dimension and a horizontal dimension, and the structures of the antennas are the number of antennas with the vertical dimension and the number of antennas with the horizontal dimension.

The base station may also configure a novel codebook for the terminal, namely a codebook different from codebooks pre-stored in the terminal and the base station. Then, the base station needs to notify information included by the novel codebook to the terminal, and the information included by the novel codebook may be, for example, the above-mentioned sampling rates, phase rotation factor and the like. Of course, the codebook indication information may also include other possible parameter information, and there are no limits to this in the embodiment of the present application.

Specifically, the terminal may also transmit an uplink reference signal to the base station, and then, the base station may measure the uplink reference signal transmitted by the terminal, determine a codebook used by the terminal in performing uplink transmission according to a measurement result in combination with a decoding result of the data transmission information and generate codebook indication information. The content of uplink reference information measurement falls within the scope of the prior art so as not to be repeatedly described herein.

After generating the above-mentioned codebook indication information, the base station may transmit the codebook indication information to the terminal. After receiving the codebook indication information, the terminal may determine a codebook specified for the terminal by the base station according to information included in the codebook indication information and performs uplink data transmission by using the codebook. Specifically, the process that the terminal determines the codebook on the basis of the information included in the codebook indication information may refer to the description of the part of the information included in the codebook indication information so as not to be repeatedly described herein.

In the embodiment of the present application, the codebook indication information or codebook update indication information transmitted to the terminal by the base station may be transmitted through a semistatic signaling or a dynamic signaling. The semistatic signal may be, for example, an RRC (Radio Resource Control) signal or an MAC CE (Media Access Control Channel Element); and the dynamic signal may be, for example, a DCI (Downlink Control Information) signal.

Specifically, the codebook indication information generated by the base station may further include a plurality of parts, for example, the codebook indication information may include first indication information and second indication information, wherein the first indication information may be one or more pieces of the information included by the above-mentioned codebook indication information, and the second indication information may be one or more pieces of the information except the first indication information in the information included by the above-mentioned codebook indication information. Of course, the codebook indication information is also not limited to include two parts of information, may further include three parts or more parts of grouped information, may be specifically and reasonably set according to an actual application, but is not limited in the embodiment of the present application.

When the codebook indication information generated by the base station includes a plurality of parts of information, the base station may unitedly or independently transmit the plurality of parts of information. For example, the base station may transmit the different parts of information to the terminal on different channels and/or at different moments.

For example, when the codebook indication information includes the first indication information and the second indication information, the base station may transmit the first indication information to the terminal through the MAC CE signal and transmit the second indication information to the terminal through the DCI information.

For example, when the first indication information includes the panel selection information, for example, the panel selection information may be the SRI, and when the second indication information includes the information of the number of the antenna ports corresponding to the codebooks, the base station may transmit the first indication information to the terminal after beam scanning of initialization access of the terminal and then transmit the second indication information to the terminal during uplink data scheduling on the terminal.

Of course, the first indication information and the second indication information may also be transmitted to the terminal through the same channel and/or at the same moment. There is not limited to this in the present application.

The above-mentioned method for indicating a corresponding codebook for the terminal by the codebook indication information will be described below by using a specific example.

The terminal and the base station may specify N codebooks by agreement, the data transmission capability information transmitted to the base station by the terminal may include the number of the TXRU with vertical dimensions and horizontal dimensions, the number of the antenna units, the codebook type selection information for the types of the codebooks and the like, wherein the codebook type selection information may include a first kind of codebooks and a second type of codebooks, wherein each codebook in the second type of codebooks corresponds to different transmission stream numbers. After the base station receives the data transmission capability information of the terminal, with the association of the measurement on the uplink reference signal, it determines that the terminal performs transmission with the second type of codebooks and determines the number of transmission streams of the terminal. The base station transmits the codebook indication information to the terminal, and the codebook indication information includes indication information and RI of the second type of codebooks, and RI is used for indicating a rank (the number of the transmission streams). The terminal may know to perform transmission, by using a codebook of which the number of streams is RI in the second type of codebooks, according to the codebook indication information.

The second implementation way is that: after receiving the data transmission capability information transmitted by the terminal, the base station decodes the data transmission capability information and feeds back the codebook indication information to the terminal, and the codebook indication information is information used for characterizing that the base station successfully decodes or fails to decode the data transmission capability information.

Specifically, when successfully decoding the data transmission capability information, the base station may know a codebook, which may be supported by the terminal, according to the data transmission capability information, and then, the base station may directly feed back the codebook indication information used for characterizing that the base station has successfully decoded the data transmission capability information to the terminal. Accordingly, after receiving the codebook indication information, the terminal may know that the base station has successfully decoded the data transmission capability information. If the base station does not specify a codebook, required to be used, for the terminal, then, the terminal may directly determine the codebook, for the terminal performing uplink data transmission, according to the data transmission capability information transmitted to the base station by the terminal, and perform uplink data transmission by using the codebook.

Specifically, when failing to decode the data transmission capability information, the base station may feed back codebook indication information used for characterizing that the base station fails to decode the data transmission capability information to the terminal. Accordingly, after receiving the codebook indication information, the terminal may know that the base station fails to decode the data transmission capability information. Then, it is possible that errors and the like happen in a transmission process of the data transmission capability information, and thus, the terminal may retransmit the current transmission capability information of the terminal to the base station. Or if the terminal currently has performed uplink data transmission by using the determined codebook, the terminal may further perform uplink data transmission by using the codebook being used currently.

In the embodiment of the present application, the codebook indication information transmitted to the terminal after the base station receives the data transmission capability information transmitted by the terminal may include codebook information for indicating the terminal to perform uplink transmission and information used for characterizing that the base station successfully decodes or fails to decode the data transmission capability information. The base station may transmit the two parts of information to the terminal at different moments and/or on different channels or transmit the two parts of information to the terminal at the same moment and/or on the same channel. Then, after receiving the two parts of information, the terminal may determine the codebook, used for performing uplink transmission, according to the two parts of information.

In the embodiment of the present application, after receiving the codebook indication information transmitted by the base station, the terminal may also comprehensively determine the codebook, used for performing uplink transmission, according to the codebook indication information and the data transmission capability information transmitted to the base station by the terminal. If the codebook finally determined by the terminal is different from the codebook indicated in the codebook indication information of the base station, the terminal may also transmit the finally determined codebook to the base station so that the base station may know the codebook used by the terminal.

In the embodiment of the present application, there is also such a situation that: after transmitting the data transmission capability information to the base station, the terminal may start to time and determine whether feedback information of the base station is received within a predefined time threshold, and the feedback information may be the above-mentioned codebook indication information or codebook update indication information used for updating the codebook. If the terminal determines that the feedback information of the base station is not received within the predefined time threshold, the terminal may determine the codebook, for performing uplink data transmission, on the basis of the data transmission capability information transmitted to the base station, or if the terminal currently has performed uplink data transmission by using the determined codebook, the terminal may further perform uplink data transmission by using the codebook being used currently.

In the embodiment of the present application, the base station may further transmit TPMI (Transmission Pre-coding Matrix Indicator) information to the terminal, and the TPMI information is used for indicating a pre-coding matrix in the codebook used by the terminal. Therefore, after the terminal receives the TPMI information and has determined the codebook used for performing uplink data transmission, the terminal may determine pre-coding matrixes corresponding to the TPMI information and the TRI in the codebook according to the TPMI information and the TRI information and the codebook determined to be used and perform the above-mentioned data transmission by using the pre-coding matrixes.

In the embodiment of the present application, the antennas of the terminal may be changed when the terminal has performed uplink data transmission by using the determined codebook. For example, a part of the antennas may be turned off when the electric quantity of the terminal is insufficient. Then, the terminal may transmit the current data transmission capability information to the base station.

Accordingly, after receiving the data transmission capability information transmitted by the base station, the base station may further determine whether the codebook being used currently by the terminal is required to be updated according to the data transmission capability information and generates codebook update indication information, wherein the codebook update indication information is used for indicating the terminal to update or not update the codebook being used currently.

After receiving the codebook update indication information transmitted by the base station, the terminal may determine whether the codebook being used currently is required to be updated. If the terminal determines that the codebook being used currently is required to be updated, the terminal may redetermine a codebook performing uplink data transmission. Specifically, a process of redetermining the codebook is the above-mentioned codebook determination process, namely the process described by the above-mentioned first implementation way or second implementation way, and therefore, the description for the process may refer to the description of the above-mentioned first implementation way or second implementation way, the descriptions thereof are omitted herein. Or, if the terminal determines that the codebook being used currently is not updated, the terminal may continue to use the codebook being used currently.

In the embodiment of the present application, the codebook update indication information transmitted to the terminal by the base station may also be transmitted through a semistatic signaling or a dynamic signaling. The semistatic signal may be, for example, an RRC (Radio Resource Control) signal or an MAC CE (Media Access Control Channel Element) signal; and the dynamic signal may be, for example, a DCI (Downlink Control Information) signal.

In the embodiment of the present application, the base station transmits transmission pre-coding matrix indicator information to the terminal; and the transmission pre-coding matrix indicator information is used for indicating a pre-coding matrix corresponding to the uplink transmission of the terminal in the codebook corresponding to the codebook indication information.

Based on the above, in the embodiment of the present application, the terminal may report the current data transmission capability information of the terminal to the base station, so that a codebook suitable for the current situation of the terminal may be determined according to the current data transmission capability information of the terminal or the terminal is notified to voluntarily determine the codebook according to the current situation of the terminal when the base station determines the codebook. In this way, either the codebook selected by the base station or the codebook voluntarily determined by the terminal conforms to the current actual situation of the terminal and conforms to the current codebook support capability of the terminal, namely the current state of the terminal is sufficient to support the used codebook, and thus, the communication experience quality of a user may be better.

Referring to FIG. 2, an embodiment of the present application further provides a method for determining an uplink transmission codebook, and processes of the method are described as follows. The method may be executed by a base station provided by the embodiment of the present application.

Step 201: the base station receives data transmission capability information transmitted by a terminal, the data transmission capability information is used for characterizing a data transmission capability which may be supported by current antennas of the terminal.

Step 202: the base station decodes the data transmission capability information and determines codebook indication information according to a decoding result, the codebook indication information is used for indicating a codebook enabling the terminal to perform uplink transmission, or the codebook indication information is used for characterizing confirmation information that the base station successfully decodes or fails to decode the data transmission capability information.

Step 203: the base station transmits the codebook indication information to the terminal.

The processes of the embodiment as shown in FIG. 1 further include a process of a method for determining an uplink transmission codebook at a base station side, and therefore, the description of the method in the embodiment as shown in FIG. 2 may refer to that in the embodiment as shown in FIG. 1, the descriptions thereof are omitted herein.

A device provided by an embodiment of the present application is described below in combination with accompanying drawings.

Figure 3:
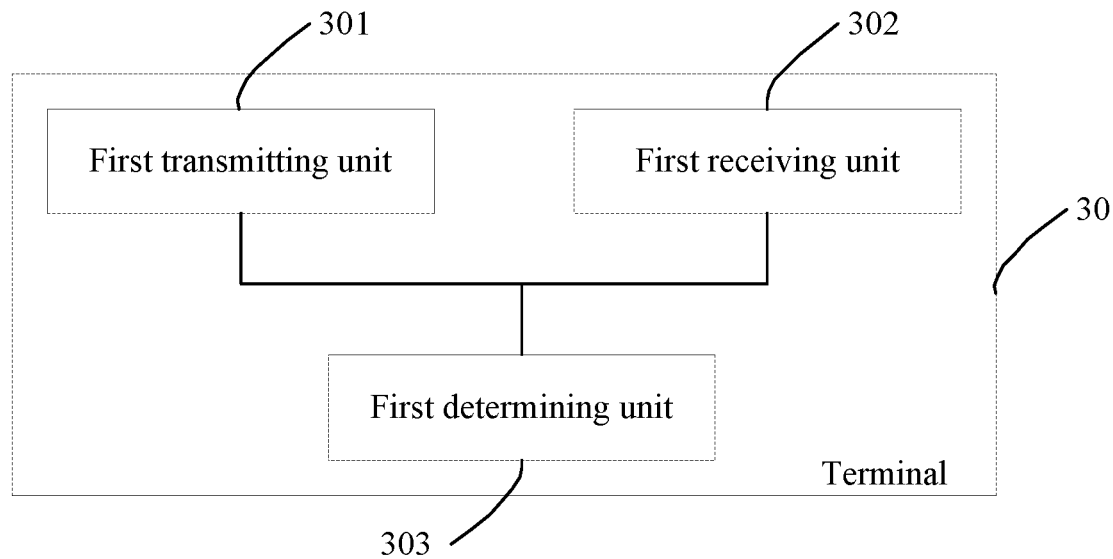
FIG. 3 is a schematic structural diagram of a terminal provided by an embodiment of the present application.

Referring to FIG. 3, based on the same inventive concept, an embodiment of the present application provides a terminal 30. The terminal 30 includes:
  a first transmitting unit 301, configured to transmit data transmission capability information to a base station, the data transmission capability information being used for characterizing a data transmission capability which may be supported by current antennas of the terminal;
  a first receiving unit 302, configured to receive codebook indication information transmitted by the base station, the codebook indication information including codebook information for indicating the terminal to perform uplink transmission, and/or information used for characterizing that the base station successfully decodes or fails to decode the data transmission capability information;
  a first determining unit 303, configured to determine a codebook corresponding to the uplink transmission, on the basis of the codebook indication information.

Optionally, the data transmission capability information includes one or more pieces of the following information:
  the number of panels which may be used by the terminal;
  the number of transceiving units included in each of the panels;
  the number of antenna ports included in each of the panels;
  the number of transceiving units supported by the terminal;
  the number of antenna ports supported by the terminal;
  the maximum value of the number of the transceiving units included in each of the panels;
  the number of antennas of the terminal;
  state information used for indicating whether the terminal uses a polarizing antenna;
  information of spatial correlation among different panels in the panels;
  information of spatial correlation among the transceiving units included in the different panels;
  information of spatial correlation among the transceiving units included in each of the panels;
  codebook type selection information used for indicating types of codebooks;
  codebook index selection information used for indicating an index of the codebooks;
  the number of antennas corresponding to the codebooks;
  structures of the antennas corresponding to the codebooks;
  sampling rates corresponding to the codebooks;
  a phase rotation factor among the antennas corresponding to the codebooks;
  power factor indication information corresponding to the codebooks; and
  pre-coding matrix grouping information corresponding to the codebooks.

Optionally, the codebook indication information includes one or more pieces of the following information:
  codebook type selection information used for indicating types of codebooks;
  codebook index selection information used for indicating an index of the codebooks;
  the number of reference signal antenna ports disposed for the terminal by the base station;
  the number of antennas corresponding to the codebooks;
  structures of the antennas corresponding to the codebooks;
  sampling rates corresponding to the codebooks;
  a phase rotation factor among the antennas corresponding to the codebooks;
  power factor indication information corresponding to the codebooks;
  pre-coding matrix grouping information corresponding to the codebooks;
  panel selection information used for indicating to select one or more panels in the panels; and
  rank indication information.

Optionally, the first determining unit 303 is further configured to when the codebook indication information is the information used for characterizing that the base station successfully decodes the data transmission capability information, determine a codebook corresponding to the data transmission capability information, on the basis of the data transmission capability information; or, when the codebook indication information is the information used for characterizing that the base station fails to decode the data transmission capability information, determine to continue to use the codebook being used currently; and
  the first transmitting unit 301 is further configured to when the codebook indication information is the information used for characterizing that the base station fails to decode the data transmission capability information, retransmit the data transmission capability information to the base station.

Optionally, the codebook indication information includes first indication information and second indication information, wherein the first indication information includes one or more pieces of the information included by the codebook indication information, and the second indication information includes one or more pieces of information except the first indication information in the information included by the codebook indication information.

The first receiving unit 302 is further configured to receive the first indication information and the second indication information transmitted, by the base station, on different channels and/or at different moments; and
  the first determining unit 303 determines the codebook corresponding to the uplink transmission, on the basis of the codebook indication information, includes that:
  the first determining unit 303 determines the codebook corresponding to the uplink information, on the basis of the first indication information and/or the second indication information.

Optionally, the first receiving unit 302 is further configured to receive codebook update indication information transmitted by the base station, wherein the codebook update indication information is used for indicating the terminal to update or not update the codebook being used currently;

the first determining unit 303 is further configured to determine whether to update the codebook being used currently, on the basis of the codebook update indication information; redetermining a codebook performing uplink data transmission if the codebook being used currently is determined to be updated; or, determine to continue to use the codebook being used currently if the codebook being used currently is determined not to be updated.

Optionally, the first determining unit 303 is further configured to: determine whether the codebook indication information transmitted by the base station is received within a predefined time threshold; determine the codebook performing uplink data transmission, on the basis of the data transmission capability information, or determine to continue to use the codebook being used currently if the codebook indication information transmitted by the base station is determined not to be received within the predefined time threshold.

Optionally, the first receiving unit 302 is further configured to receive transmission pre-coding matrix indicator information transmitted by the base station; the transmission pre-coding matrix indicator information is used for indicating a pre-coding matrix in the codebook used by the terminal; and the first determining unit 303 is further configured to determine the pre-coding matrix for data transmission according to the codebook corresponding to the uplink transmission and the transmission pre-coding matrix indicator information, and perform data transmission by using the pre-coding matrix.

The terminal 30 may be configured to execute the method provided by the embodiment as shown in FIG. 1. Therefore, a function and the like which may be realized by each functional module of the device may refer to the description in the embodiment as shown in FIG. 1, the descriptions thereof are omitted herein.

Figure 4:
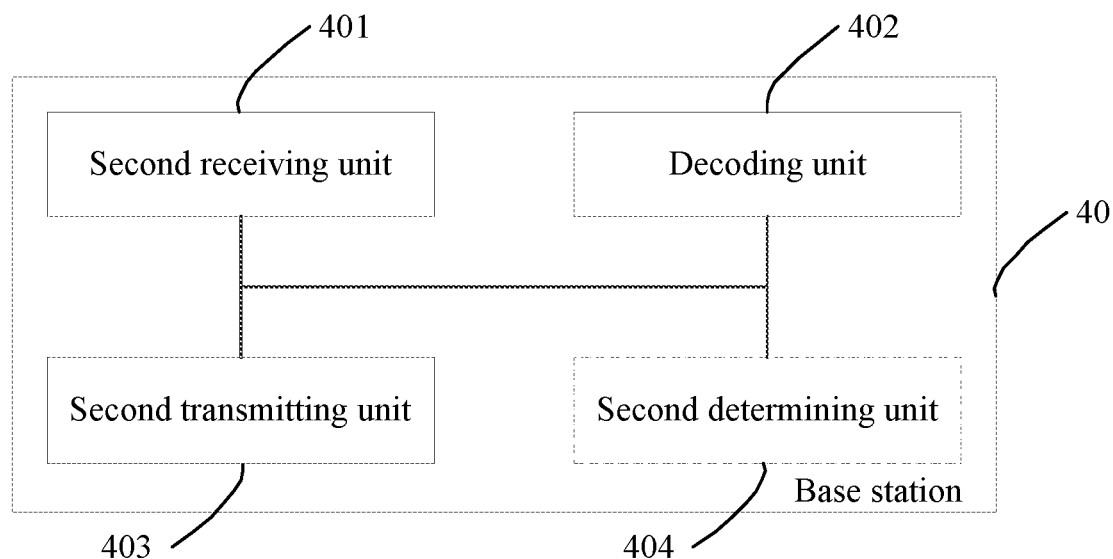
FIG. 4 is a schematic structural diagram of a base station provided by an embodiment of the present application.

Referring to FIG. 4, based on the same inventive concept, an embodiment of the present application provides a base station 40. The base station 40 includes:

a second receiving unit 401, configured to receive data transmission capability information transmitted by a terminal, the data transmission capability information being used for characterizing a data transmission capability which may be supported by current antennas of the terminal;

a decoding unit 402, configured to decode the data transmission capability information and determining codebook indication information according to a decoding result, the codebook indication information being used for indicating a codebook enabling the terminal to perform uplink transmission, or the codebook indication information being used for characterizing confirmation information that the base station successfully decodes or fails to decode the data transmission capability information; and a second transmitting unit 403, configured to transmit the codebook indication information to the terminal.

Optionally, the second receiving unit is further configured to receive an uplink reference signal transmitted by the terminal; and the decoding unit is further configured to measure the uplink reference signal and determine the codebook indication information on the basis of a measurement result and the decoding result.

Optionally, the codebook indication information includes one or more pieces of the following information:
codebook type selection information used for indicating types of the codebooks;
codebook index selection information used for indicating an index of the codebooks;
the number of reference signal antenna ports configured for the terminal by the base station;
the number of antennas corresponding to the codebooks;
structures of the antennas corresponding to the codebooks;
sampling rates corresponding to the codebooks;
a phase rotation factor among the antennas corresponding to the codebooks;
power factor indication information corresponding to the codebooks;
pre-coding matrix grouping information corresponding to the codebooks;
panel selection information used for indicating that one or more panels in the panels are selected; and
rank indication information.

Optionally, the codebook indication information includes first indication information and second indication information, wherein the first indication information includes one or more pieces of the information included by the codebook indication information, and the second indication information includes one or more pieces of the information except the first indication information in the information included by the codebook indication information;

the second transmitting unit 403 transmits the codebook indication information to the terminal, includes:
the second transmitting unit 403 transmits the first indication information and the second indication information to the terminal on different channels and/or different moments.

Optionally, the base station further includes a second determining unit 404;

the second determining unit 404 is configured to determine whether the codebook being used currently by the terminal is required to be updated, on the basis of the data transmission capability information;
the decoding unit 402 is further configured to generate codebook update indication information on the basis of a determination result, the codebook update indication information is used for indicating the terminal to update or not update the codebook being used currently; and
the second transmitting unit 403 is further configured to transmit the codebook update indication information to the terminal.

Optionally, the second transmitting unit 403 is further configured to transmit the codebook indication information or the codebook update indication information to the terminal through a semistatic signaling or a dynamic signaling.

Optionally, the second transmitting unit 403 is further configured to transmit transmission pre-coding matrix indicator information to the terminal; and the transmission pre-coding matrix indicator information is used for indicating a pre-coding matrix corresponding to the uplink transmission of the terminal in the codebook corresponding to the codebook indication information.

The base station 40 may be configured to execute the method provided in the embodiment as shown in FIG. 2. Therefore, a function and the like which may be realized by each functional module of the device may refer to the description in the embodiment as shown in FIG. 2, the descriptions thereof are omitted herein. The second determining unit 404 is not a required functional module so as to be shown with a dotted line in FIG. 4.

Figure 5:
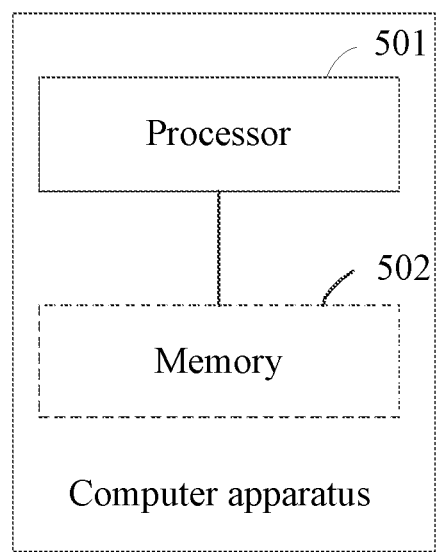
FIG. 5 is a schematic structural diagram of a computer apparatus provided by an embodiment of the present application.

Referring to FIG. 5, an embodiment of the present application further provides a computer apparatus including a processor 501, the processor 501 is configured to implement the steps of methods for transmitting and receiving downlink control information provided by embodiments of the present application when executing a computer program stored in a memory.

Optionally, the processor 501 may be specifically a central processing unit, an ASIC (Application Specific Integrated Circuit), one or more integrated circuits for controlling programs to be executed, a hardware circuit developed by using an FPGA (Field Programmable Gate Array) and a baseband processor.

Optionally, the processor 501 may include at least one processing core.

Optionally, the computer apparatus further includes a memory 502, and the memory 502 may include an ROM (Read Only Memory), an RAM (Random Access Memory) and a magnetic disk memory. The memory 502 is used for storing data required when the processor 501 operates. One or more memories 502 are provided. The memory 502 is shown together in FIG. 5. However, it should be known that the memory 502 is not a required functional module so as to be shown with a dotted line in FIG. 5.

An embodiment of the present application further provides a computer readable storage medium in which a computer program is stored, and the steps of the methods for determining the uplink transmission codebook provided by the embodiments of the present application are implemented when the computer program is executed by the processor.

It should be understood by the skilled in the art that the embodiments of the present application may provide a method, system or computer program product. Therefore, forms of a complete hardware embodiment, a complete software embodiment or a software and hardware aspect combined embodiment may be used in the present application. In addition, a form of the computer program product executed on one or more computer available storage media (including, but not limited to the magnetic disk memory, a CD-ROM, an optical memory and the like) including computer available program codes may be used in the present application.

It should be understood that each of an antenna port, a physical antenna and an antenna including a radio frequency channel may be sometimes called as an antenna for short by the skilled in the art, therefore, the "antenna" in the present application is not limited to the "physical antenna", may also be the "antenna port", the "antenna including a radio frequency channel" and the like. In the view of the terminal, one antenna port may correspond to one radio frequency channel, and optionally, one radio frequency channel corresponds to a plurality of antenna ports.

The present application is described by referring to flow diagrams and/or block diagrams of the method, device (system) and computer program product according to the embodiments of the present application. It should be understood that each flow and/or block in the flow diagrams and/or block diagrams as well as a combination of flows and/or blocks in the flow diagrams and/or block diagrams may be realized by computer program instructions. The computer program instructions may be provided to a general-purpose computer, a special-purpose computer, an embedded processor or processors of other programmable data processing devices to generate a machine, so that an apparatus for realizing specified functions in one or more flows in the flow programs and/or one or more blocks in the block diagrams is generated through the instructions executed by the computer or the processors of other programmable data processing devices.

The computer program instructions may also be stored in a computer readable memory capable of guiding the computer or other programmable data processing devices to work in a specific way, so that the instructions stored in the computer readable memory generate a product including an instruction apparatus, and the instruction apparatus realizes the functions specified in the one or more flows in the flow diagrams and/or one or more blocks in the block diagrams.

The computer program instructions may also be loaded in the computer or other programmable data processing devices, so that a series of operation steps are performed on the computer or other programmable data processing devices to generate processing realized by the computer, and furthermore, the instructions executed on the computer or other programmable data processing devices provide steps for realizing the specified functions in the one or more flows in the flow diagrams and/or one or more blocks in the block diagrams.

Although the preferred embodiments of the present application have been described, those skilled in the art can make additional changes and modifications on these embodiments once they acquire the basic creative concept. Therefore, attached claims are intended to be explained to include the preferred embodiments and all the changes and modifications that fall within the scope of the present application.

Obviously, those skilled in the art can make various alterations and transformations on the embodiments of the present application without departing from the spirits and scopes of the embodiments of the present application. In this way, if these alterations and transformations of the embodiments of the present application fall within the scope of the claims of the present application and equivalent technologies of the claims, the present application is also intended to include these alterations and transformations.

What is claimed is:

1. A method for determining an uplink transmission codebook, comprising:
transmitting, by a terminal, data transmission capability information to a base station, the data transmission capability information being used for characterizing a data transmission capability which may be supported by current antennas of the terminal;
receiving, by the terminal, codebook indication information transmitted by the base station, the codebook indication information comprising codebook information used for indicating a codebook enabling the terminal to perform uplink transmission, and/or information used for characterizing that the base station successfully decodes or fails to decode the data transmission capability information; and
determining, by the terminal, a codebook corresponding to the uplink transmission, on the basis of the codebook indication information.

2. The method according to claim 1, wherein the data transmission capability information comprises one or more pieces of following information:
a quantity of panels which may be used by the terminal;
a quantity of transceiving units comprised in each of the panels;

a quantity of antenna ports comprised in each of the panels;
a quantity of transceiving units supported by the terminal;
a quantity of antenna ports supported by the terminal;
a maximum value of a quantity of the transceiving units comprised in each of the panels;
a quantity of antennas of the terminal;
state information used for indicating whether the terminal uses a polarizing antenna;
information of spatial correlation among different panels in the panels;
information of spatial correlation among the transceiving units comprised in the panels;
information of spatial correlation among the transceiving units comprised in each of the panels;
codebook type selection information used for indicating a type of codebook;
codebook index selection information used for indicating an index of a codebook;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook; and
pre-coding matrix grouping information corresponding to a codebook.

3. The method according to claim 1, wherein the codebook information comprises one piece of following information:
codebook type selection information used for indicating a type of a codebook;
codebook index selection information used for indicating an index of a codebook;
a quantity of reference signal antenna ports configured for the terminal by the base station;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook;
pre-coding matrix grouping information corresponding to a codebook;
panel selection information used for indicating that one or more panels in the panels are selected; and
rank indication information.

4. The method according to claim 3, wherein the codebook information is separated into first indication information and second indication information, wherein the first indication information comprises one or more pieces of the information comprised by the codebook indication information, and the second indication information comprises one or more pieces of information except the first indication information in the information comprised by the codebook indication information;
the method further comprises:
receiving, by the terminal, the first indication information and the second indication information transmitted, by the base station, on different channels and/or at different moments; and
determining, by the terminal, the codebook corresponding to the uplink transmission, on the basis of the codebook indication information, comprises:
determining, by the terminal, the codebook corresponding to the uplink information, on the basis of the first indication information and/or the second indication information;
or
wherein after the determining, by the terminal, the codebook corresponding to the uplink transmission, on the basis of the codebook indication information, the method further comprises:
receiving, by the terminal, codebook update indication information transmitted by the base station, wherein the codebook update indication information is used for instructing the terminal to update or not update the codebook being used currently;
determining, by the terminal, whether to update the codebook being used currently, on the basis of the codebook update indication information, redetermining, by the terminal, a codebook performing uplink data transmission if the terminal determines to update the codebook being used currently; or determining, by the terminal, to continue to use the codebook being used currently if the terminal determines not to update the codebook being used currently.

5. The method according to claim 1, wherein when the codebook indication information comprises information used for characterizing that the base station successfully decodes or fails to decode the data transmission capability information, determining, by the terminal, the codebook corresponding to the uplink transmission, on the basis of the codebook indication information, comprises:
when the codebook indication information comprises the information used for characterizing that the base station successfully decodes the data transmission capability information, determining, by the terminal, a codebook corresponding to the data transmission capability information, on the basis of the data transmission capability information; or,
when the codebook indication information comprises the information used for characterizing that the base station fails to decode the data transmission capability information, retransmitting, by the terminal, the data transmission capability information to the base station; or,
when the codebook indication information comprises the information used for characterizing that the base station fails to decode the data transmission capability information, determining, by the terminal, to continue to use the codebook being used currently.

6. A method for determining an uplink transmission codebook, comprising:
receiving, by a base station, data transmission capability information transmitted by a terminal, the data transmission capability information being used for characterizing a data transmission capability which may be supported by current antennas of the terminal;
decoding, by the base station, the data transmission capability information, and determining codebook indication information according to a decoding result, the codebook indication information comprising codebook information used for indicating a codebook enabling the terminal to perform uplink transmission, and/or information used for characterizing that the base station successfully decodes or fails to decode the data transmission capability information; and
transmitting, by the base station, the codebook indication information to the terminal.

7. The method according to claim 6, further comprising:
receiving, by the base station, an uplink reference signal transmitted by the terminal; and
wherein decoding, by the base station, the data transmission capability information, and determining the codebook indication information according to the decoding result, comprises:
measuring, by the base station, the uplink reference signal, and generating the codebook indication information on the basis of a measurement result and the decoding result.

8. The method according to claim 6, wherein the codebook information comprises one piece of following information:
codebook type selection information used for indicating a type of a codebook;
codebook index selection information used for indicating an index of a codebook;
a quantity of reference signal antenna ports configured for the terminal by the base station;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook;
pre-coding matrix grouping information corresponding to a codebook;
panel selection information used for indicating that one or more panels in the panels are selected; and
rank indication information.

9. The method according to claim 8, wherein the codebook information is separated into first indication information and second indication information, wherein the first indication information comprises one or more pieces of the information comprised by the codebook indication information, and the second indication information comprises one or more pieces of the information except the first indication information in the information comprised by the codebook indication information;
wherein transmitting, by the base station, the codebook indication information to the terminal, comprises:
transmitting, by the base station, the first indication information and the second indication information to the terminal on different channels and/or different moments.

10. The method according to claim 6, further comprising:
transmitting, by the base station, transmission pre-coding matrix indicator information to the terminal, the transmission pre-coding matrix indicator information being used for indicating a pre-coding matrix corresponding to the uplink transmission of the terminal in the codebook corresponding to the codebook indication information.

11. A terminal comprising a memory configured to store a computer readable program, and a processor, wherein the processor is configured to read the computer-readable program to perform following:
transmitting data transmission capability information to a base station, the data transmission capability information being used for characterizing a data transmission capability which may be supported by current antennas of the terminal;
receiving codebook indication information transmitted by the base station, the codebook indication information comprising codebook information used for indicating a codebook enabling the terminal to perform uplink transmission, and/or information used for characterizing that the base station successfully decodes or fails to decode the data transmission capability information; and
determining a codebook corresponding to the uplink transmission, on the basis of the codebook indication information.

12. The terminal according to claim 11, wherein the data transmission capability information comprises one or more pieces of following information:
a quantity of panels which may be used by the terminal;
a quantity of transceiving units comprised in each of the panels;
a quantity of antenna ports comprised in each of the panels;
a quantity of transceiving units supported by the terminal;
a quantity of antenna ports supported by the terminal;
a maximum value of a quantity of the transceiving units comprised in each of the panels;
a quantity of antennas of the terminal;
state information used for indicating whether the terminal uses a polarizing antenna;
information of spatial correlation among different panels in the panels;
information of spatial correlation among the transceiving units comprised in the panels;
information of spatial correlation among the transceiving units comprised in each of the panels;
codebook type selection information used for indicating a type of a codebook;
codebook index selection information used for indicating an index of a codebook;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook; and
pre-coding matrix grouping information corresponding to a codebook.

13. The terminal according to claim 11, wherein the codebook information comprises one piece of following information:
codebook type selection information used for indicating a type of a codebook;
codebook index selection information used for indicating an index of a codebook;
a quantity of reference signal antenna ports disposed for the terminal by the base station;
a quantity of antennas corresponding to a codebook;
structures of the antennas corresponding to a codebook;
sampling rates corresponding to a codebook;
a phase rotation factor among the antennas corresponding to a codebook;
power factor indication information corresponding to a codebook;
pre-coding matrix grouping information corresponding to a codebook;
panel selection information used for indicating to select one or more panels in the panels; and
rank indication information.

14. The terminal according to claim 13, wherein the codebook information is separated into first indication information and second indication information, wherein the first indication information comprises one or more pieces of the information comprised by the codebook indication information, and the second indication information comprises one or more pieces of information except the first indication information in the information comprised by the codebook indication information;

wherein the processor is also configured to read the computer-readable program to perform following:

receiving the first indication information and the second indication information transmitted, by the base station, on different channels and/or at different moments; and determining the codebook corresponding to the uplink transmission, on the basis of the codebook indication information, by:

determining the codebook corresponding to the uplink information, on the basis of the first indication information and/or the second indication information;

or wherein after the determining the codebook corresponding to the uplink transmission, on the basis of the codebook indication information, the processor is also configured to read the computer-readable program to perform following:

receiving codebook update indication information transmitted by the base station, wherein the codebook update indication information is used for instructing the terminal to update or not update the codebook being used currently;

determining whether to update the codebook being used currently, on the basis of the codebook update indication information, redetermining a codebook performing uplink data transmission if it is determined to update the codebook being used currently; or determining to continue to use the codebook being used currently if it is determined not to update the codebook being used currently.

15. The terminal according to claim 11, wherein the processor is also configured to read the computer-readable program to perform following:

when the codebook indication information comprises the information used for characterizing that the base station successfully decodes the data transmission capability information, determining a codebook corresponding to the data transmission capability information, on the basis of the data transmission capability information; or, when the codebook indication information comprises the information used for characterizing that the base station fails to decode the data transmission capability information, retransmitting the data transmission capability information to the base station; or, when the codebook indication information comprises the information used for characterizing that the base station fails to decode the data transmission capability information, determining to continue to use the codebook being used currently.

16. A base station comprising a memory configured to store a computer readable program, and a processor, wherein the processor is configured to read the computer-readable program to perform the method of claim 6.

17. The base station according to claim 16, wherein the processor is also configured to read the computer-readable program to perform following:

receiving an uplink reference signal transmitted by the terminal; and wherein decoding the data transmission capability information, and determining the codebook indication information according to the decoding result, comprises:

measuring the uplink reference signal, and generating the codebook indication information on the basis of a measurement result and the decoding result.

18. The base station according to claim 16, wherein the codebook information comprises one piece of following information:

codebook type selection information used for indicating a type of a codebook;

codebook index selection information used for indicating an index of a codebook;

a quantity of reference signal antenna ports configured for the terminal by the base station;

a quantity of antennas corresponding to a codebook;

structures of the antennas corresponding to a codebook;

sampling rates corresponding to a codebook;

a phase rotation factor among the antennas corresponding to a codebook;

power factor indication information corresponding to a codebook;

pre-coding matrix grouping information corresponding to a codebook;

panel selection information used for indicating that one or more panels in the panels are selected; and rank indication information.

19. The base station according to claim 18, wherein the codebook information is separated into comprises first indication information and second indication information, wherein the first indication information comprises one or more pieces of the information comprised by the codebook indication information, and the second indication information comprises one or more pieces of the information except the first indication information in the information comprised by the codebook indication information;

wherein transmitting the codebook indication information to the terminal, comprises:

transmitting the first indication information and the second indication information to the terminal on different channels and/or different moments.

20. The base station according to claim 16, wherein the processor is also configured to read the computer-readable program to perform following:

transmitting transmission pre-coding matrix indicator information to the terminal, the transmission pre-coding matrix indicator information being used for indicating a pre-coding matrix corresponding to the uplink transmission of the terminal in the codebook corresponding to the codebook indication information.

\* \* \* \* \*